United States Patent
Shapira (10) Patent No.: US 7,225,246 B2
(45) Date of Patent: May 29, 2007

(54) DATA TRACKING USING IP ADDRESS FILTERING OVER A WIDE AREA NETWORK

(75) Inventor: Elijahu Shapira, Portland, OR (US)

(73) Assignee: WebTrends, Inc., Portland, OR (US)

( * ) Notice: Subject to any disclaimer, the term of this patent is extended or adjusted under 35 U.S.C. 154(b) by 918 days.

(21) Appl. No.: 09/934,994

(22) Filed: Aug. 21, 2001

(65) Prior Publication Data

US 2002/0040394 A1    Apr. 4, 2002

Related U.S. Application Data

(60) Provisional application No. 60/226,788, filed on Aug. 21, 2000.

(51) Int. Cl.
*G06F 15/173*    (2006.01)

(52) U.S. Cl. ............ 709/223; 709/224; 709/203; 709/217

(58) Field of Classification Search ........ 709/223–225, 709/203, 217, 219, 229
See application file for complete search history.

(56) References Cited

U.S. PATENT DOCUMENTS

| | | | | |
|---|---|---|---|---|
| 5,740,549 A | * | 4/1998 | Reilly et al. ............ | 705/14 |
| 5,787,253 A | * | 7/1998 | McCreery et al. ......... | 709/231 |
| 5,796,952 A | * | 8/1998 | Davis et al. ............ | 709/224 |
| 5,892,917 A | * | 4/1999 | Myerson ............... | 709/224 |
| 5,991,740 A | | 11/1999 | Messer | |
| 6,018,619 A | * | 1/2000 | Allard et al. ........... | 709/224 |
| 6,055,510 A | * | 4/2000 | Henrick et al. .......... | 705/14 |
| 6,112,238 A | * | 8/2000 | Boyd et al. ............ | 709/224 |
| 6,151,601 A | * | 11/2000 | Papierniak et al. ........ | 707/10 |
| 6,178,505 B1 | | 1/2001 | Schneider et al. | |
| 6,237,006 B1 | | 5/2001 | Weinberg et al. | |
| 6,249,820 B1 | * | 6/2001 | Dobbins et al. .......... | 709/238 |

(Continued)

OTHER PUBLICATIONS

Zaiane et al, Discovering Web Access Patterns and Trends by Applying OLAP and Data mining Technology on Web Logs. Research and Technology Advances in Digital Libraries, 1998. ADL 98. Proceedings. IEEE International Forum on Apr. 22-24, 1998 pp. 19-29.*

(Continued)

*Primary Examiner*—Ario Etienne
*Assistant Examiner*—LaShonda Jacobs
(74) *Attorney, Agent, or Firm*—Marger Johnson & McCollom, P.C.

(57) ABSTRACT

The preferred method for implementing the invention includes presetting IP filters and storing a web page on a first server coupled to a wide area network, whereby the web page including data mining code. The web page would then be uploaded to a visitor computer responsive to a request over the wide area network from the visitor computer, whereby the visitor computer would have a designated IP address. The data mining code would then be operated on the visitor computer to obtain technical data. A subsequent step would be receiving at a second server the technical data and the IP address of the visitor computer and generating a log file incorporating the technical data and IP address. The IP filters would be applied to the IP address stored in the log file and a database file would then be generated from the log file responsive to the IP filters.

13 Claims, 7 Drawing Sheets

U.S. PATENT DOCUMENTS

| | | | |
|---|---|---|---|
| 6,278,966 B1 * | 8/2001 | Howard et al. | 703/23 |
| 6,282,548 B1 | 8/2001 | Burner et al. | |
| 6,317,787 B1 * | 11/2001 | Boyd et al. | 709/224 |
| 6,330,592 B1 * | 12/2001 | Makuch et al. | 709/217 |
| 6,393,407 B1 * | 5/2002 | Middleton et al. | 705/14 |
| 6,393,479 B1 * | 5/2002 | Glommen et al. | 709/224 |
| 6,741,990 B2 * | 5/2004 | Nair et al. | 707/9 |
| 6,766,327 B2 * | 7/2004 | Morgan et al. | 707/101 |
| 6,792,458 B1 * | 9/2004 | Muret et al. | 709/224 |
| 6,804,701 B2 * | 10/2004 | Muret et al. | 709/203 |
| 2003/0110293 A1 * | 6/2003 | Friedman et al. | 709/245 |

OTHER PUBLICATIONS

Haigh, et al., Measuring Web Site Usage: Log File Analysis, Network Notes #57, Aug. 4, 1998, pp. 1-8.

Shahabi, et al., Knowledge Discovery From Users Web-Page Navigation, Article—International Workshop On Research Issues In Data Engineering, 1997, pp. 20-29.

I-Yuan Lin, et al., Capturing User Access Patterns In The Web For Data Mining, Article—Tools With Artificial Intelligence Proceedings, Nov. 9, 1999, pp. 345-348.

European Patent Office, Supplementary European Search Report, Application No. EP 01 96 6108, Feb. 22, 2006, pp. 1-4.

* cited by examiner

DATA TRACKING USING IP ADDRESS FILTERING OVER A WIDE AREA NETWORK

CROSS-REFERENCES TO RELATED APPLICATIONS

This application claims the benefit from U.S. Provisional Patent Application No. 60/226,788 filed Aug. 21, 2000 whose contents are incorporated herein for all purposes.

BACKGROUND OF THE INVENTION

1. Field of the Invention

The present application relates to compiling and reporting data associated with activity on a network server and more particularly to compiling and reporting server data that is associated with commercial activity on a server using IP address filtering prior to data reporting.

2. Description of the Prior Art

Programs for analyzing traffic on a network server, such as a worldwide web server, are known in the art. One such prior art program is described in U.S. patent application Ser. No. 09/240,208, filed Jan. 29, 1999, for a Method and Apparatus for Evaluating Visitors to a Web Server, which is incorporated herein by reference for all purposes and is assigned in common with the present application. In these prior art systems, the program typically runs on the web server that is being monitored. Data is compiled, and reports are generated on demand—or are delivered from time to time via email—to display information about web server activity, such as the most popular page by number of visits, peak hours of website activity, most popular entry page, etc.

Analyzing activity on a worldwide web server from a different location on a global computer network ("Internet") is also known in the art. To do so, a provider of remote web-site activity analysis ("service provider") generates JavaScript code that is distributed to each subscriber to the service. The subscriber copies the code into each web-site page that is to be monitored. When a visitor to the subscriber's web site loads one of the web-site pages into his or her computer, the JavaScript code collects information, including time of day, visitor domain, page visited, etc. The code then calls a server operated by the service provider—also located on the Internet—and transmits the collected information thereto. Information is also transmitted in a known manner via a cookie.

Each subscriber has a password to access a page on the service provider's server. This page includes a set of tables that summarize, in real time, activity on the customer's web site.

It is understood that not all activity on a web site is commercial or potentially commercial in nature. Instead, some visitors to the web site might be the web site owner's own employees that are only testing the operation of the web site. Such traffic is not important to the commercial success of the web page since such visitors have no intention of buying anything on the web site. Accordingly, the need arises for somehow obtaining a more accurate representation of commercial activity on a web server by only reporting activity on the web site from actual or potential customers.

SUMMARY OF THE INVENTION

The present invention realizes this goal by filtering the raw activity data using information obtained from the computer requesting the information from the web server.

The preferred method for implementing the invention includes presetting IP filters and storing a web page on a first server coupled to a wide area network, whereby the web page including data mining code. The web page would then be uploaded to a visitor computer responsive to a request over the wide area network from the visitor computer, whereby the visitor computer would have a designated IP address. The data mining code would then be operated on the visitor computer to obtain technical data. A subsequent step would be receiving at a second server the technical data and the IP address of the visitor computer and generating a log file incorporating the technical data and IP address. The IP filters would be applied to the IP address stored in the log file and a database file would then be generated from the log file responsive to the IP filters.

The network for implementing the invention includes a visitor node having a browser program coupled to the network, whereby the visitor node provides requests for information on the network. The network further includes a web site node having a respective web site responsive to requests for information from the visitor node to provide media content and data mining code to the visitor node. The apparatus also includes a tracking node including a log file and a database. The tracking node is responsive to a communication from the visitor node based upon the data mining code to store visitor data obtained from the visitor node into the log file. Finally, the apparatus network includes a filter node responsive to the visitor data based on a filter to select the visitor data for storage in a data base, whereby said data base is accessible by an owner of the web site node to view relevant traffic data to the web site node.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

APPENDICES I through IV illustrate a preferred source code method for implementing the invention.

DETAILED DESCRIPTION OF THE PREFERRED EMBODIMENT

Figure 1:
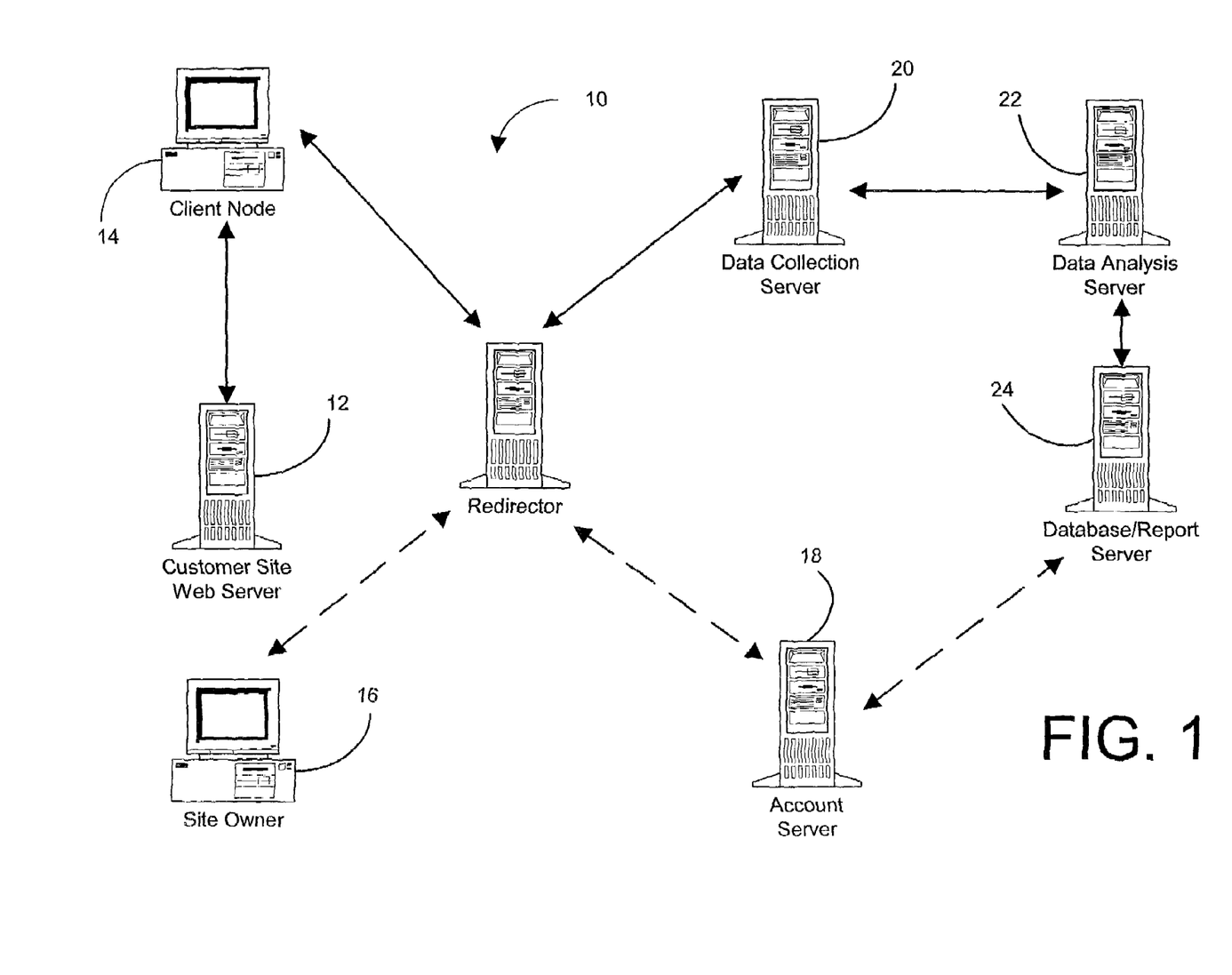
FIG. 1 is a schematic view of a network implementation for carrying out a preferred embodiment of the invention.

Turning now to FIG. 1, indicated generally at 10 is a highly schematic view of a portion of the Internet. FIG. 1 depicts a system implementing the present invention. Included thereon is a worldwide web server 12. Server 12, in the present example, is operated by a business that sells products via server 12, although the same implementation can be made for sales of services via the server. The server includes a plurality of pages that describe the business and the products that are offered for sale. It also includes an order page, like the one shown in FIG. 2, that a site visitor can download to his or her computer, like computer 14, using a conventional browser program running on the computer. The order form typically contains—for products—the national currency that the seller accepts, an identification of the product, the number of products sold, and the unit price for each product. After a site visitor at computer 14 fills in the information in FIG. 2, the visitor actuates a screen-image button 15 that places the order by transmitting the information from computer 14 to server 12 over the network. Upon receipt of this information, server 12 typically confirms the order via email to computer 14. The seller then collects payment, using a credit-card number provided in the FIG. 2 form, and ships the product.

As mentioned above, it would be advantageous to the seller to have an understanding about how customers and potential customers use server 12. As also mentioned above, it is known to obtain this understanding by analyzing web-server log files at the server that supports the selling web site. It is also known in the art to collect data over the Internet and generate activity reports at a remote server.

When the owner of server 12 first decides to utilize a remote service provider to generate such reports, he or she uses a computer 16, which is equipped with a web browser, to visit a web server 18 operated by the service provider. On server 18, the subscriber opens an account and creates a format for real-time reporting of activity on server 12.

To generate such reporting, server 18 provides computer 16 with a small piece of code, typically JavaScript code. The subscriber simply copies and pastes this code onto each web page maintained on server 12 for which monitoring is desired. When a visitor from computer 14 loads one of the web pages having the embedded code therein, the code passes predetermined information from computer 14 to a server 20—also operated by the service provider—via the Internet. This information includes, e.g., the page viewed, the time of the view, the length of stay on the page, the visitor's identification, etc. Server 20 in turn transmits this information to an analysis server 22, which is also maintained by the service provider. This server analyzes the raw data collected on server 20 and passes it to a database server 24 that the service provider also operates.

Figure 5A:
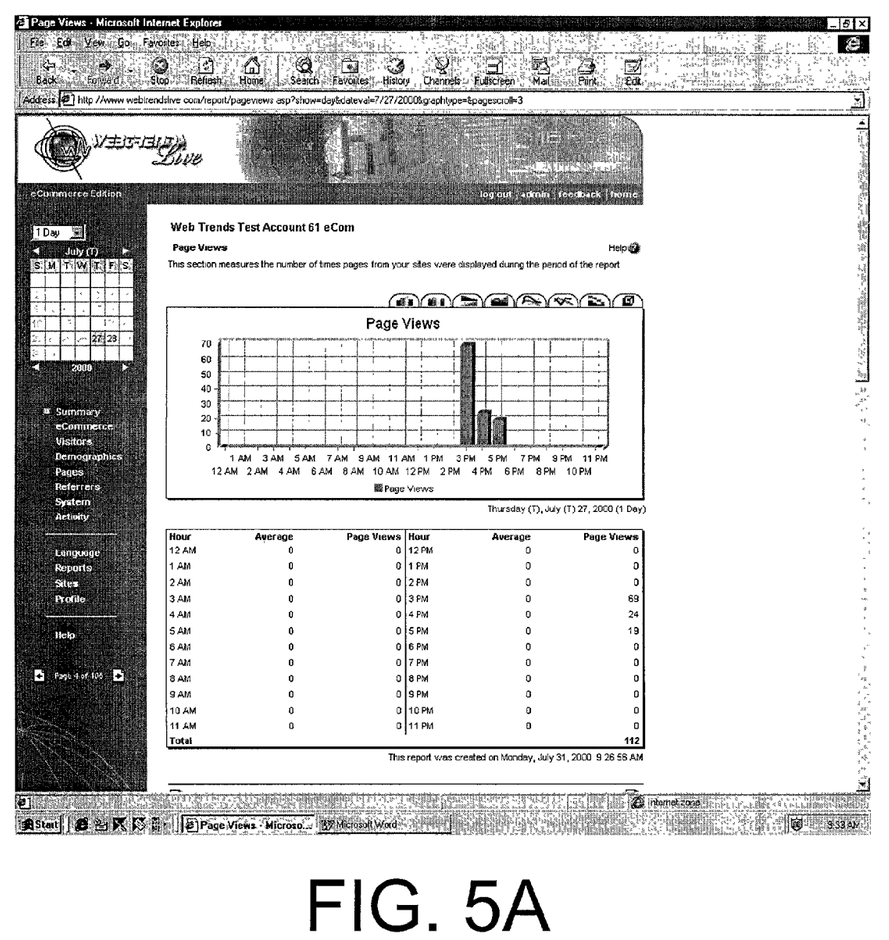
FIGS. 5A and 5B show report pages illustrating site visitor information concerning the web page being tracked by a web site tracking service using the invention.
Figure 5B:
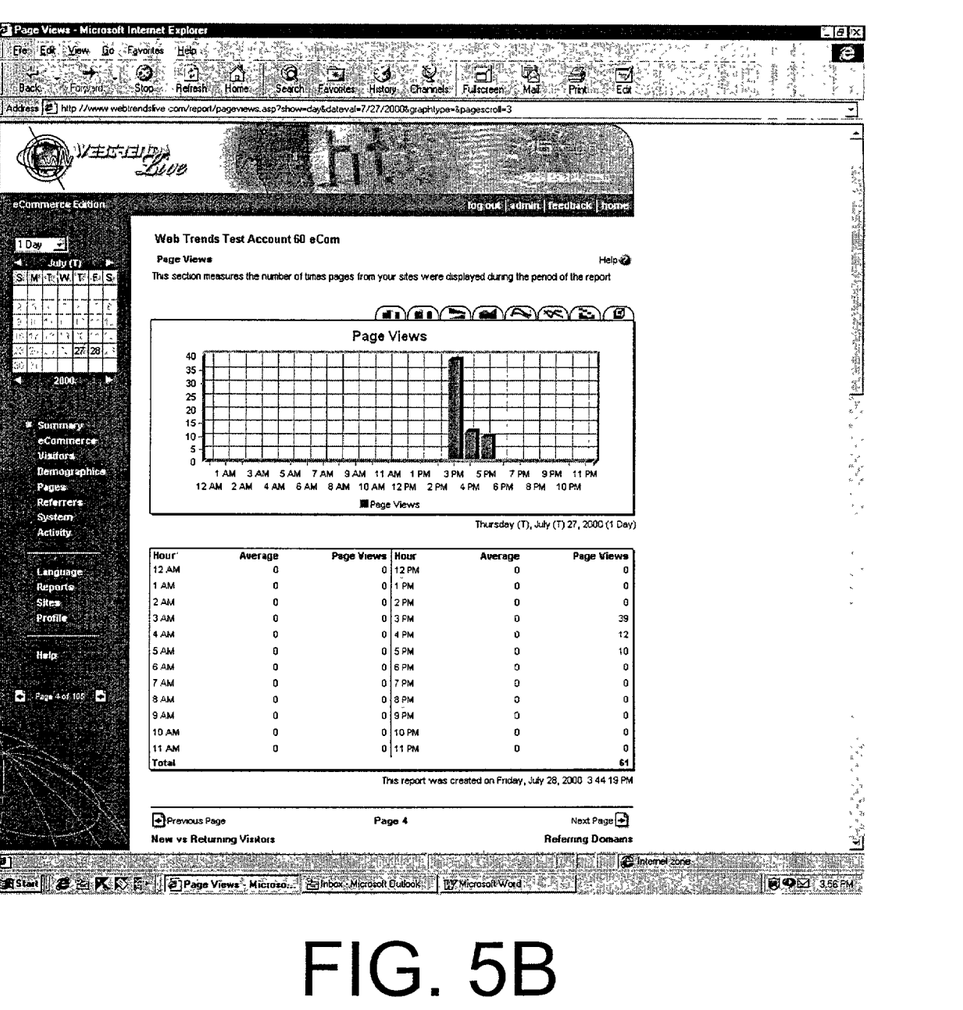

When the subscriber would like to see and print real-time statistics, the subscriber uses computer 16 to access server 18, which in turn is connected to database server 24 at the service provider's location. The owner can then see and print reports, sample pages of which are shown in FIGS. 5A and 5B, that provide real-time information about the activity at server 12.

The above-described arrangement for monitoring web server activity by a service provider over the Internet is generally known in the art. Information analyzed in prior art systems, however, consists of what might be thought of as technical data, such as most popular pages, referring URLs, total number of visitors, returning visitors, etc. As will now be explained, applicant has developed the ability to analyze commercial data as well, e.g., number of orders, total revenues, etc., generated by server 18, as explained in detail below.

Applicant has developed a method in which data relating to revenues, products sold, categories of products, etc., is collected, analyzed and displayed in various report formats. An example of code that can be used to implement this method is shown in Appendices I and II. When the subscriber opens an account with the service provider by connecting computer 16 to server 18, as described above, the code in Appendices I and II is transferred from service 18 to computer 16 in a known manner. The subscriber then determines which pages on the server 12 web site he or she would like to track. The subscriber then opens each page to be tracked a text editor, and the code from Appendix I is pasted into the bottom of the page. Although the code in Appendix I does not provide an image on the page, it should be appreciated that code that includes an image such as a logo or the like, could be included in the Appendix I code. This would consequently both track the page and display an image thereon.

After the Appendix I code is pasted onto each page to be tracked, including an order confirmation page, the code in Appendix II, which defines a variable called ORDER, is also pasted onto the order confirmation page. This variable appears on line 7 of the Appendix I code.

The variable ORDER, among other things, defines the currency that is used to purchase the product. The currency need only be entered once, and in the example is USD for U.S. dollars. There are four other items that are included in the variable for each product ordered. In the order appearing in the variable they are first, the product name; second, the category that the product is in; third, the number of products purchased; and fourth, the unit price for the product. As can be seen in the Appendix II code, each item of information in the ORDER variable is included for each product purchased.

Figure 2:
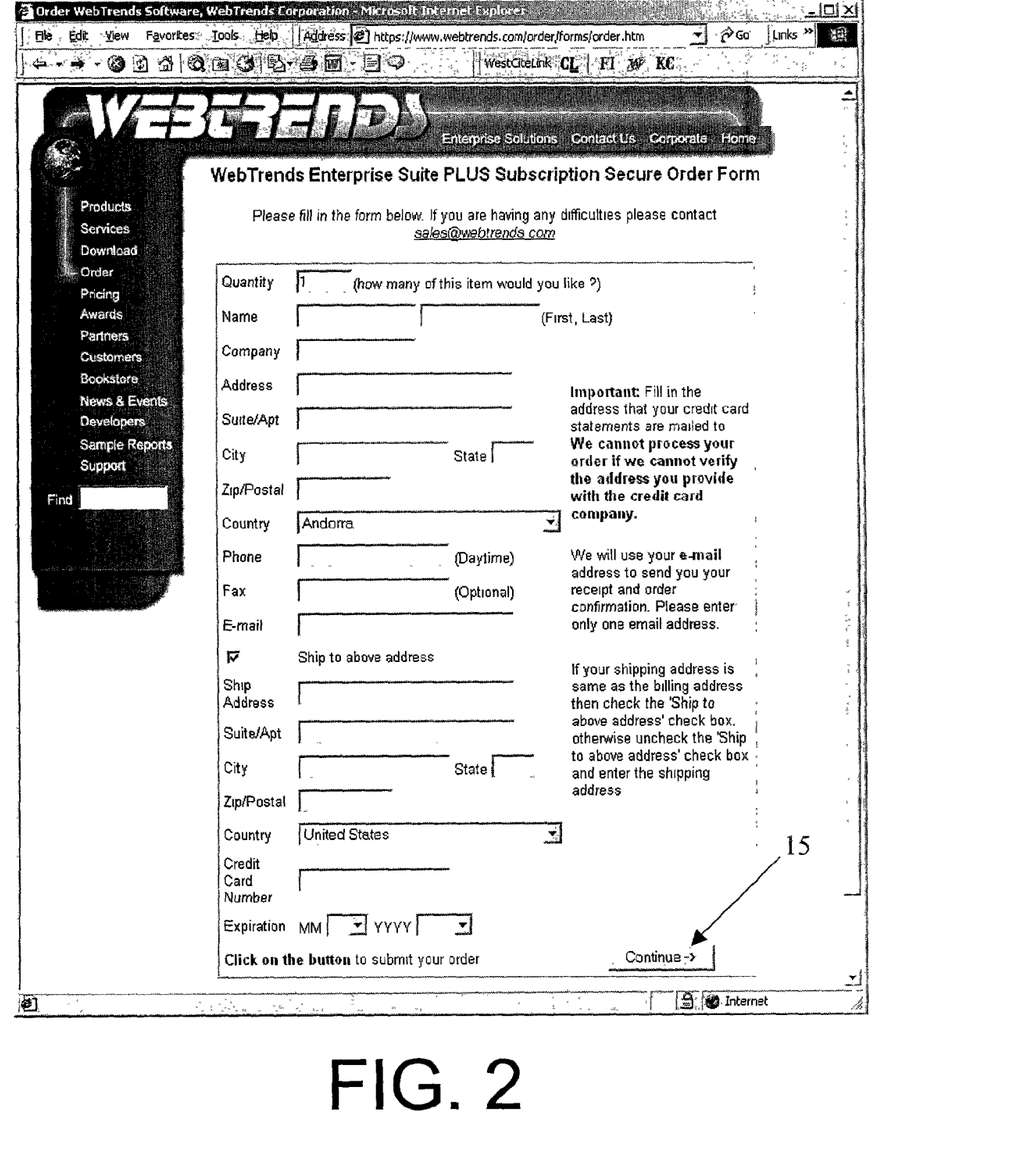
FIG. 2 is a sample order page included on a commercial web site implementing the present invention.

In operation, a site visitor using computer 14 first fills in all the information in the FIG. 2 form. The visitor then clicks button 15 in FIG. 2, and an order confirmation page (not shown) appears that includes the product, category, number, and unit price information, for each product ordered. The code in Appendices I and II collects this information, along with the usual data relating to traffic, visitors, visitors' systems, etc., and transmits it to service 20. This data is analyzed on server 22 as described above and stored on database 24.

When the business owner operating the website on server 12 wants to determine activity on that site, he or she logs onto his or her account on web server 18 via computer 16. After entering the appropriate user name and password, reports that are maintained in real time, as described above, are accessed, viewed, and—if desired—printed by the subscriber. Examples of various reports are available through the webtrendslive.com reporting service, operated by the assignee of this application, that reports the following commercial activity: Revenue over Time, Revenue by Category, Revenue by Product, Units over Time, Units by Category, Units by Product, Category Sales Trends, and Product Sales Trends.

In addition to viewing the reports that are maintained in real time, the account owner can define time periods during which the information can be displayed in the format shown in the enclosed reports. There is also a feature that the account owner can select to cause reports to be periodically mailed to computer 16.

IP Address Filtering

It is understood that not all activity on a web site is commercial or potentially commercial in nature. Instead, some visitors to the web site might be the web site owner's own employees that are only testing the operation of the web site. Such traffic is not important to the commercial success of the web page since such visitors have no intention of buying anything on the web site. Accordingly, one aspect of obtaining a more accurate representation of commercial activity on a web server is only reporting activity on the web site from actual or potential customers. The present invention realizes this goal by filtering the raw activity data using information obtained from the computer requesting the information from the web server.

A conventional method for identifying computers on a network, such as the Internet, is by "Internet Protocol" or IP addresses. These addresses are currently expressed as a series of four numbers separated by periods (A.B.C.D) where each number is between 0 and 255. In FIG. 1, for instance, the visitor computer 14 is identified by an IP address that is attached as a tag to all communications over the Internet (or any network using IP Addressing schema) originating from that computer. Similarly, all communications to visitor computer 14, as from server 12, include a destination tag referencing that computer's four-digit IP address. When server 12 receives the request for information from visitor computer 14, it sends the requested information back through the Internet with a destination address of the visitor computer 14. The requested information from server 12 is passed through routers (not shown) that ultimately direct the information to the visitor computer having the particular destination address. This is a common method for passing information back and forth between particular computers over a network.

Currently, data obtained via web site analysis tools such as those known in the prior art track all visitors to a particular web site. While this information is oftentimes useful, the data can be misleading since the number and type of visitors can be skewed when the web site owner's own employees visit the site for testing, verification or other work-related reason. Therefore, the need remains for a method and system for reporting only those visitors that may be relevant to the site owner's business.

The present invention operates to conduct web traffic analysis based on web site hits coming only from computers having IP addresses within specified ranges. A "hit" is defined as a request by a visitor computer of a web page from a server hosting the web site that includes the requested web page. Multiple requests result in multiple hits.

The two types of filters are INCLUDE and EXCLUDE. The INCLUDE filter will allow a hit to be counted if the IP address of the visitor computer 14 is a match against the filter. The EXCLUDE filter will allow a hit to be counted if the IP address of the visitor computer 14 is not a match against the filter. The EXCLUDE filter is most useful in the situation noted above where hits from a company's own employees are excluded from the web traffic analysis report. This can be accomplished because the web site owner has knowledge of the IP addresses of its employees' own computers.

Figure 3A:
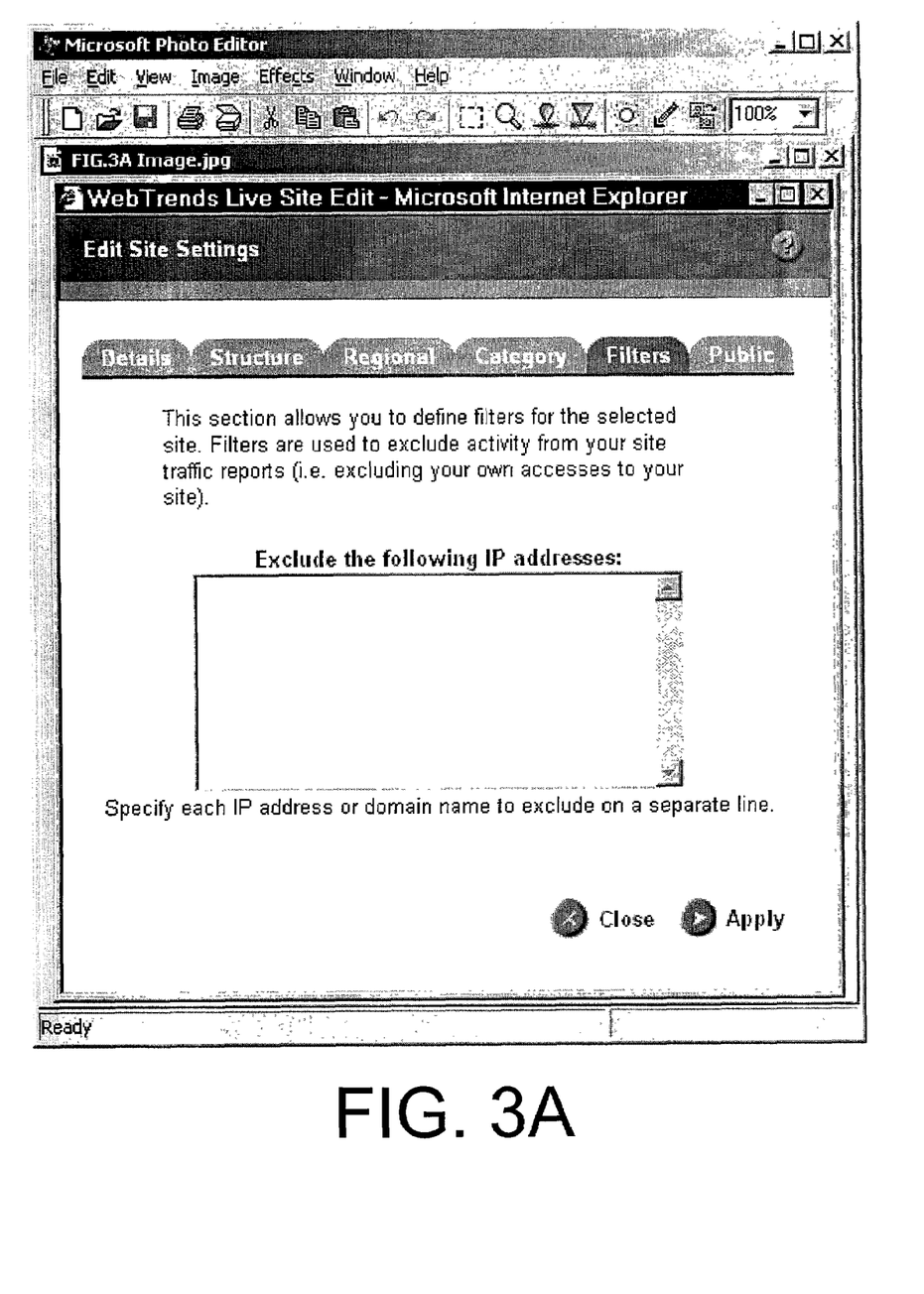
FIGS. 3A and 3B illustrate screen shots showing examples of an administrative console user interface in which the EXCLUDE filters are set by the web site owner.
Figure 3B:
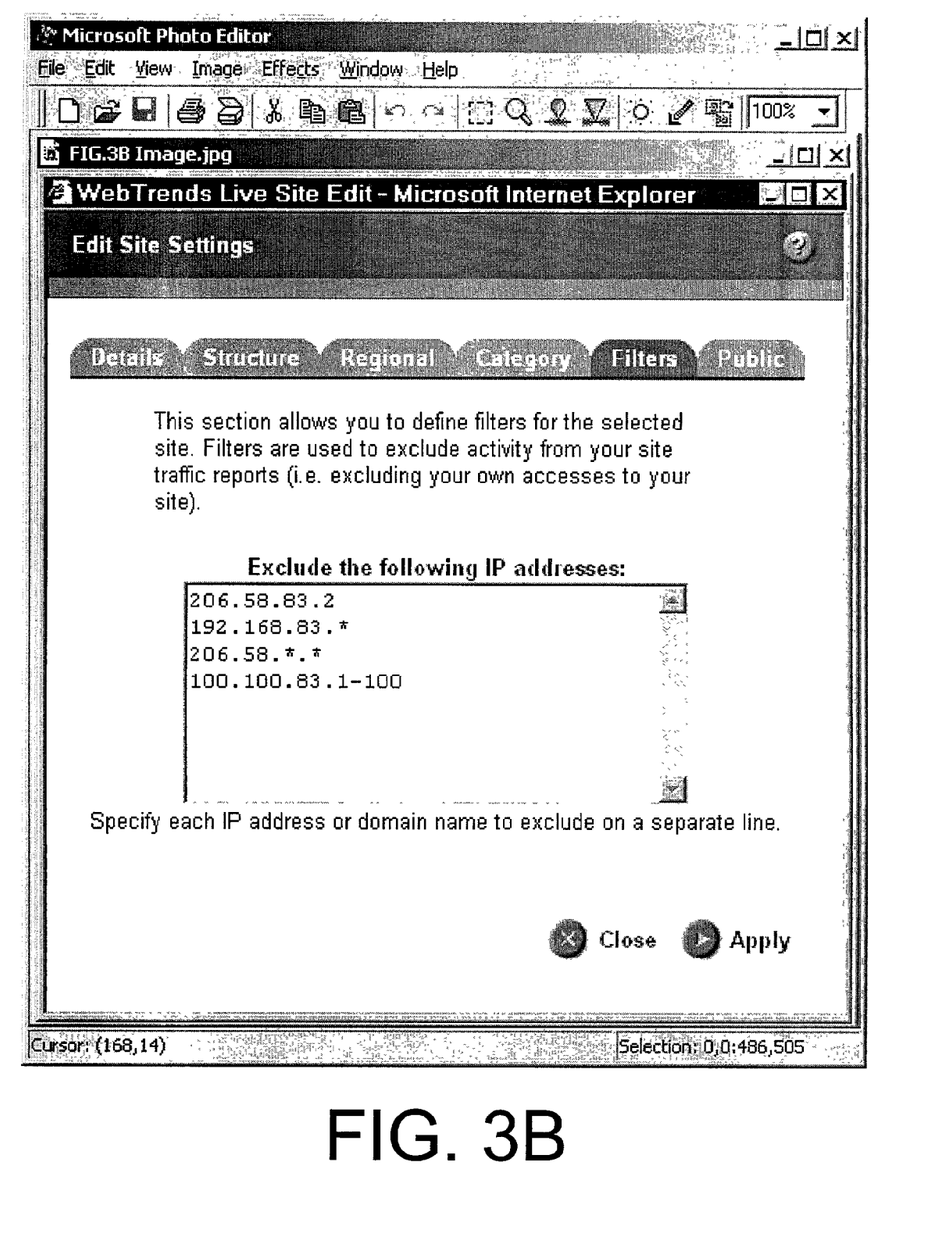

FIGS. 3A and 3B illustrate screen shots showing examples of an administrative console user interface in which the EXCLUDE filters are set by the web site owner. The filter is specified as "E.F.G.H" where E, F, G and H can be set to:

1. Match everything (the '*' character)
2. Match only a particular number (e.g., a designated number between 0 and 255)
3. A range specification (a number followed by a '–' character followed by another number).

In FIG. 3A, the EXCLUDE filters are set to default so that no IP addresses are then filtered out of the compiled visitor data. In FIG. 3B, however, the IP address EXCLUDE filters are set to filter out hits originating from computers having the following IP addresses:

1. The computer having the IP address 206.58.83.2
2. Any computer having an IP address where the first three numbers are, in order, 192.168.83;
3. Any computer having an IP address where the first two numbers are, in order, 206.58; and
4. Any computer having the first three numbers of their IP addresses as "100.100.83" and the final number within the range of 1 and 100.

Note that the first filter is a subset of the third filter since the third filter would necessarily operate to exclude the computer having the IP address "206.58.83.2".

The IP address filtering above is only intended to represent an example of one method in which visitor's to a web site can be filtered according to their identity or originating computer address. Three other examples are expressed below:

A first alternate method is to use an IP address (A.B.C.D) with a subnet mask (E.F.G.H) where the incoming visitor IP address (W.X.Y.Z) is filtered according to evaluations using the binary AND (&) operator:

$W\&E=A$ $X\&F=B$ $Y\&G=C$ $Z\&H=D$

A match occurs if all four equations are true.

A second alternative method is to use classless interdomain routing (CIDR), in which subnet ranges are specified. The CIDR specification is documented in RFC 1517, RFC1518, RFC1519, and RFC1520 using the designation A.B.C.D/M (Example: 192.168.0.0/16). The IP address A.B.C.D. represents the "IP Prefix" and the M specifies the mask length. For an incoming visitor IP address to match the filter, the M number of leftmost contiguous significant bits in the "IP Prefix" and the "test" IP Address must be equal.

A third alternative is to use a standard pattern matching specification like Regular Expressions to match the visitor IP address.

As explained above with reference to commercial transaction reporting, the code shown in Appendix I is pasted onto each page to be tracked. As the code is downloaded with the web page by the visitor computer, the Appendix I code executes within the visitor's computer to gather available data such as the type of browser being used, URL of page being viewed, length of time viewed, etc.

Appendix III shows another example of the type of code that can fulfill this data mining function. Once the data is collected by operation of the JavaScript code within the visitor computer's web browser, the data is transmitted over the Internet to service 20. An example of the location of the service to which the data is transmitted, and the data folder into which the log file is written, is identified within the code of Appendix III:

```
v+= 'http://stats.webtrendslive.com/S005-00-5-18-
    2994-11462/scripts/wttagv2.cgi?
    sid=005-00-5-18-2994-11462&siteID=11462&
    tagver=2&tz=~800&ed=ecommerce&button=&';
``` where the first two lines denote the location of the network server designated by the web site tracking service provider to store the log file information and the final two lines denote the specific data folder within the server. The numbers included in the final two lines of the above code are specific to the customer/owner of the web page being tracked and are generated when the customer signs up for the service. The data is transmitted to service 20 along with the IP address of the sending (visitor's) computer 14 by operation of the JavaScript code in Appendix III upon the browser program (Internet Explorer or Netscape Navigator).

Figure 4:
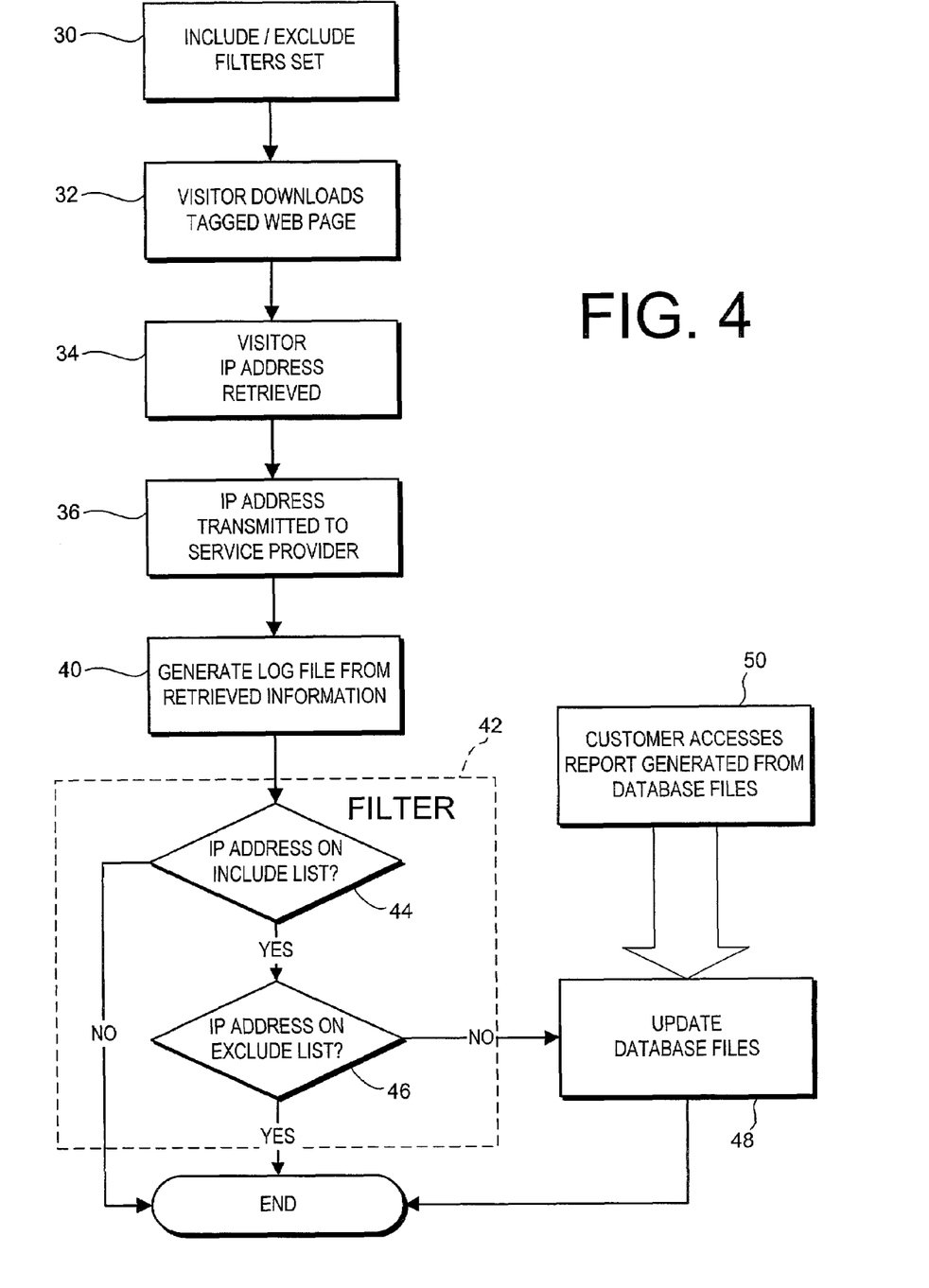
FIG. 4 is a flow diagram illustrating the software method operable on the data analysis server in FIG. 1 to filter the hits according to the IP addresses of the visiting computer according to a preferred embodiment of the invention.

Attention is now directed to the flow diagram shown in FIG. 4 illustrating the operation of the invention. The INCLUDE and/or EXCLUDE filters are set in step 30 using the administrative console user interface shown in FIG. 3. In step 32, the visitor downloads a web page containing the added JavaScript code shown in Appendix I or III. The code operates within the visitor computer's browser to obtain and then transmit specified information to server 20 operated by the web tracking service to which is appended the IP address of the sending (visitor's) computer 14. The IP address is retrieved by the visitor's computer web browser in step 34 and transmitted to the service provider server 20 in step 36. The retrieved information, including the IP address, are stripped out and stored within a log file generated on server 20 in step 40.

The IP filtering step is then conducted on the log files using software operable on analysis server 22. An example of software operable on the data analysis server 22 to filter the hits according to the IP addresses of the visiting computer 14 is shown in Appendix IV and is represented by box 42 of FIG. 4. Step 44 then queries whether the data within the log file originated from a visitor computer having an IP address specified within the INCLUDE filter list. If the IP address is on the list (or if no filter is specified thus defaulting to a "YES" condition), then the filtering process proceeds to step 46. Step 46 then queries whether the data within the log file originated from a visitor computer having an IP address specified within the EXCLUDE filter list. If the IP address is not on the list (or if no filter is specified thus defaulting to a "NO" condition), then the filtering process proceeds to step 48 in which the database files stored within database 24 are updated to reflect the new information. If the IP address is either not on the INCLUDE list or is on the EXCLUDE, then the log file is ignored and the database is not updated. The database files may be queried by a customer (step 50) in real time by logging onto the web traffic reporting server 18 as described above.

FIGS. 5A and 5B show report pages illustrating site visitor information to the web page being tracked. FIG. 5A illustrates site visitors in which no IP EXCLUDE filters were designated, as shown in FIG. 3A. FIG. 5B, on the other hand, illustrates the number of site visitors by hour in which hits originating from computers having IP addresses as designated in FIG. 3B have been excluded from the report. Assuming that the IP addresses set in FIG. 3B represent computers used by the web site owner's own employees, it is understood that the filtered data shown in FIG. 5B represents a more accurate view of the effective traffic at the web site as a measure of popularity.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A method for generating web traffic reports comprising the steps of:
   presetting IP filters;
   storing a web page on a first server coupled to a wide area network, said web page including data mining code;
   uploading the web page to a visitor computer responsive to a request over the wide area network from the visitor computer, said visitor computer having a designated IP address;
   operating the data mining code on the visitor computer to obtain technical data;
   receiving at a second server the technical data and the IP address of the visitor computer and generating a log file incorporating the technical data and IP address;
   applying the IP filters to the IP address stored in the log file; and
   generating a database file from the log file responsive to the IP filters.

2. The method of claim 1, wherein the step of presetting IP filters includes setting an INCLUDE IP filter.

3. The method of claim 1, wherein the step of presetting IP filters includes setting an EXCLUDE filter.

4. The method of claim 1, wherein the step of applying the IP filters to the IP addresses includes the step of using classless inter-domain routing.

5. The method of claim 1, wherein the step of applying the IP filters to the IP addresses includes the step of using standard pattern matching specifications like Regular Expressions.

6. The method of claim 1 further including the steps of:
   defining a subnet mask; and
   filtering the IP addresses using the subnet mask with a binary AND operator.

7. A network comprising:
   a visitor node having a browser program coupled to said network, said visitor node providing requests for information on said network;
   a web site node having a respective web site responsive to requests for information from said visitor node to provide media content and data mining code to said visitor node;
   a tracking node including a log file and a database, said tracking node responsive to a communication from said visitor node based upon said data mining code to store visitor data obtained from said visitor node into said log file; and
   a filter node responsive to said visitor data based on a filter to select said visitor data for storage in a database, whereby said database is accessible by an owner of said web site node to view relevant traffic data to the web site node.

8. A network in accordance with claim 7, wherein said filter node selects said visitor data based on whether the visitor data is included within the filter.

9. A network in accordance with claim 7, wherein said filter node selects said visitor data based on whether the visitor data is excluded from the filter.

10. A network in accordance with claim 7, wherein said filter is an IP address filter.

11. A network in accordance with claim 7, wherein said filter is a subnet mask applied to an IP address of the visitor node using an AND operator.

12. A network in accordance with claim 7, wherein said filter uses classless inter-domain routing.

13. A network in accordance with claim 7, wherein said filter uses standard pattern matching specifications like Regular Expressions.

* * * * *